United States Patent
Yu (10) Patent No.: US 11,811,686 B2
(45) Date of Patent: Nov. 7, 2023

(54) PACKET REORDERING METHOD OF SOUND BAR

(71) Applicant: MEDIATEK INC., Hsin-Chu (TW)

(72) Inventor: Nan-Shu Yu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 31 days.

(21) Appl. No.: 17/539,124

(22) Filed: Nov. 30, 2021

(65) Prior Publication Data

US 2022/0182341 A1 Jun. 9, 2022

Related U.S. Application Data (60) Provisional application No. 63/122,518, filed on Dec. 8, 2020.

(51) Int. Cl.
*H04L 49/9057* (2022.01)

(52) U.S. Cl.
CPC .................. *H04L 49/9057* (2013.01)

(58) Field of Classification Search
CPC ..... H04L 49/9057; H04L 47/32; H04L 47/34; H04N 5/602; H04R 3/00
See application file for complete search history.

(56) References Cited

U.S. PATENT DOCUMENTS

| 2011/0238424 | A1 | 9/2011 | Keller | |
|---|---|---|---|---|
| 2015/0106106 | A1* | 4/2015 | Atti | H04L 1/0075 |
| | | | | 704/500 |
| 2018/0295050 | A1* | 10/2018 | Lee | H04L 43/087 |

FOREIGN PATENT DOCUMENTS

| CN | 103124348 A | 5/2013 |
|---|---|---|
| CN | 106131710 A | 11/2016 |
| CN | 109754823 A | 5/2019 |
| JP | 4692550 | 6/2011 |
| TW | 201007700 A1 | 2/2010 |
| TW | 201638932 A | 11/2016 |

* cited by examiner

*Primary Examiner* — Jianye Wu
(74) *Attorney, Agent, or Firm* — Winston Hsu (57) ABSTRACT

The present invention provides a signal processing method of a speaker, wherein the signal processing method includes the steps of: receiving a plurality of packets, wherein the plurality of packets correspond to at least two audio frames, each audio frame has at least two of the packets, and each packet comprises a sequence number indicating an order of the packet in the plurality of packets; sorting the plurality of packets to generate reordered packets; and rendering the reordered packets to a middleware to regenerate the at least two audio frames.

10 Claims, 8 Drawing Sheets

FIG. 8

PACKET REORDERING METHOD OF SOUND BAR

CROSS REFERENCE TO RELATED APPLICATIONS

This application claims the priority of U.S. Provisional Application No. 63/122,518, filed on Dec. 8, 2020, which is included herein by reference in its entirety.

BACKGROUND

Recently, a television (TV) may wirelessly transmit high-quality audio signal to a speaker for playing high-quality music. In order to provide the high-quality audio signal, audio signal may not be compressed so that each audio frame may need to be divided into several packets for wireless transmission. For example, one audio frame corresponding to a pulse-code modulation (PCM) mode may be divided into two packets, and one audio frame corresponding to Dolby mode may be divided into three packets. Regarding the transmission of the audio frame, the packets must be transmitted sequentially, that is, if the audio frame is divided into three packets with sequence numbers '1'-'3', the TV first transmits the packet with sequence number '1', then transmits the packet with sequence number '2', and finally transmits the packet with sequence number '3'. Then, the speaker sequentially receives the packets with sequence numbers '1'-'3' to regenerate the audio frame for playback.

However, the packets sent by the TV may be in the wrong order due to some reasons, which will cause the speaker to fail to generate the audio frame correctly.

SUMMARY

It is therefore an objective of the present invention to provide a method for reordering packets received from the TV, to solve the above-mentioned problems.

According to one embodiment of the present invention, a signal processing method of a speaker comprises the steps of: receiving a plurality of packets, wherein the plurality of packets correspond to at least two audio frames, each audio frame has at least two of the packets, and each packet comprises a sequence number indicating an order of the packet in the plurality of packets; sorting the plurality of packets to generate reordered packets; and rendering the reordered packets to a middleware to regenerate the at least two audio frames.

According to another embodiment of the present invention, a circuitry within a speaker is configured to perform the steps of: receiving a plurality of packets, wherein the plurality of packets correspond to at least two audio frames, each audio frame has at least two of the packets, and each packet comprises a sequence number indicating an order of the packet in the plurality of packets; sorting the plurality of packets to generate reordered packets; and rendering the reordered packets to a middleware to regenerate the at least two audio frames.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
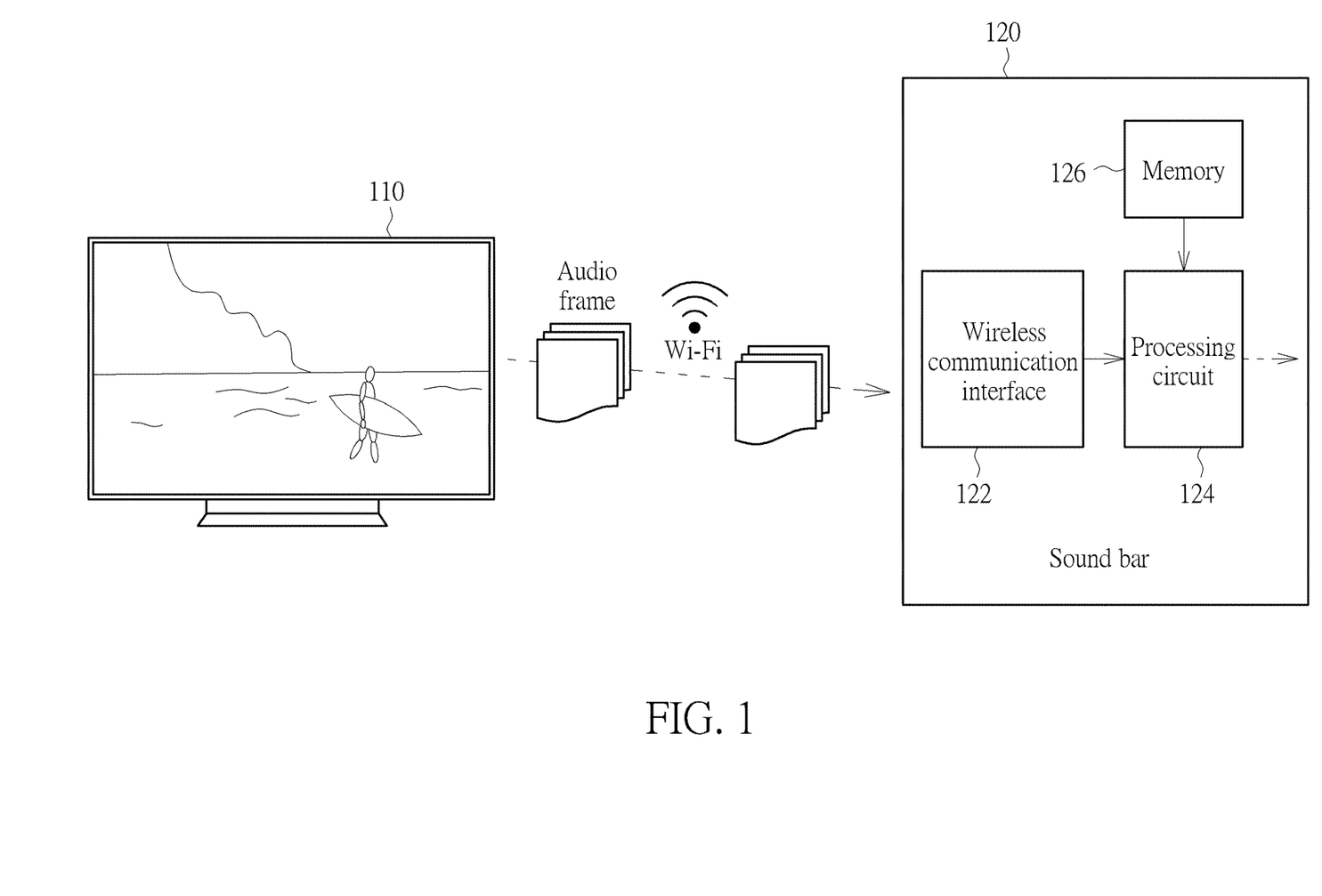
FIG. 1 is a diagram illustrating a TV and a speaker according to one embodiment of the present invention.

FIG. 1 is a diagram illustrating a TV 110 and a speaker (in this embodiment, a sound bar 120 serves as the speaker) according to one embodiment of the present invention. As shown in FIG. 1, the TV 110 is configured to display the images and further to transmit audio frames to the sound bar 120, for the sound bar 120 to play the sounds. In this embodiment, in order to provide the high-quality audio signal, the audio signal may not be compressed so that each audio frame may need to be divided into several packets for wireless transmission. For example, one audio frame corresponding to the PCM mode may be divided into two packets, and one audio frame corresponding to Dolby mode may be divided into three packets. After the sound bar 120 receives the packets, the sound bar 120 regenerates the audio frames. In this embodiment, the wireless transmission between the TV 110 and the sound bar 120 is complied with a typical WIFI Speaker Connection (WSC) specification.

As described in the Background, ideally, the packets must be transmitted sequentially, but the packets sent by the TV 110 may be in the wrong order due to some reasons. For example, referring to FIG. 2, it is assumed that the TV 110 transmits three audio frames to the sound bar 120, wherein a first audio frame is divided into three packets having sequence numbers '1'-'3', respectively, a second audio frame is divided into three packets having sequence numbers '4'-'6', respectively, and a third audio frame is divided into three packets having sequence numbers '7'-'9', respectively. Ideally, the packets having sequence numbers '1'-'9' are transmitted to the sound bar 120 sequentially. However, in an abnormal case, the packets received by the sound bar 120 may have sequence number '3', sequence number '1' and sequence number '2' in sequence. In addition, in a duplicated case, some packets may be transmitted repeatedly, for example, the sound bar 120 may receive five packets having sequence numbers '4', '5', '4', '6', '6' corresponding to the second audio frame. In addition, for the transmission of the packets, the packets corresponding to the same audio frame may be transmitted within 5 milliseconds (ms), and a transmission time for the packets corresponding to the same audio frame may be 32 ms.

Figure 2:
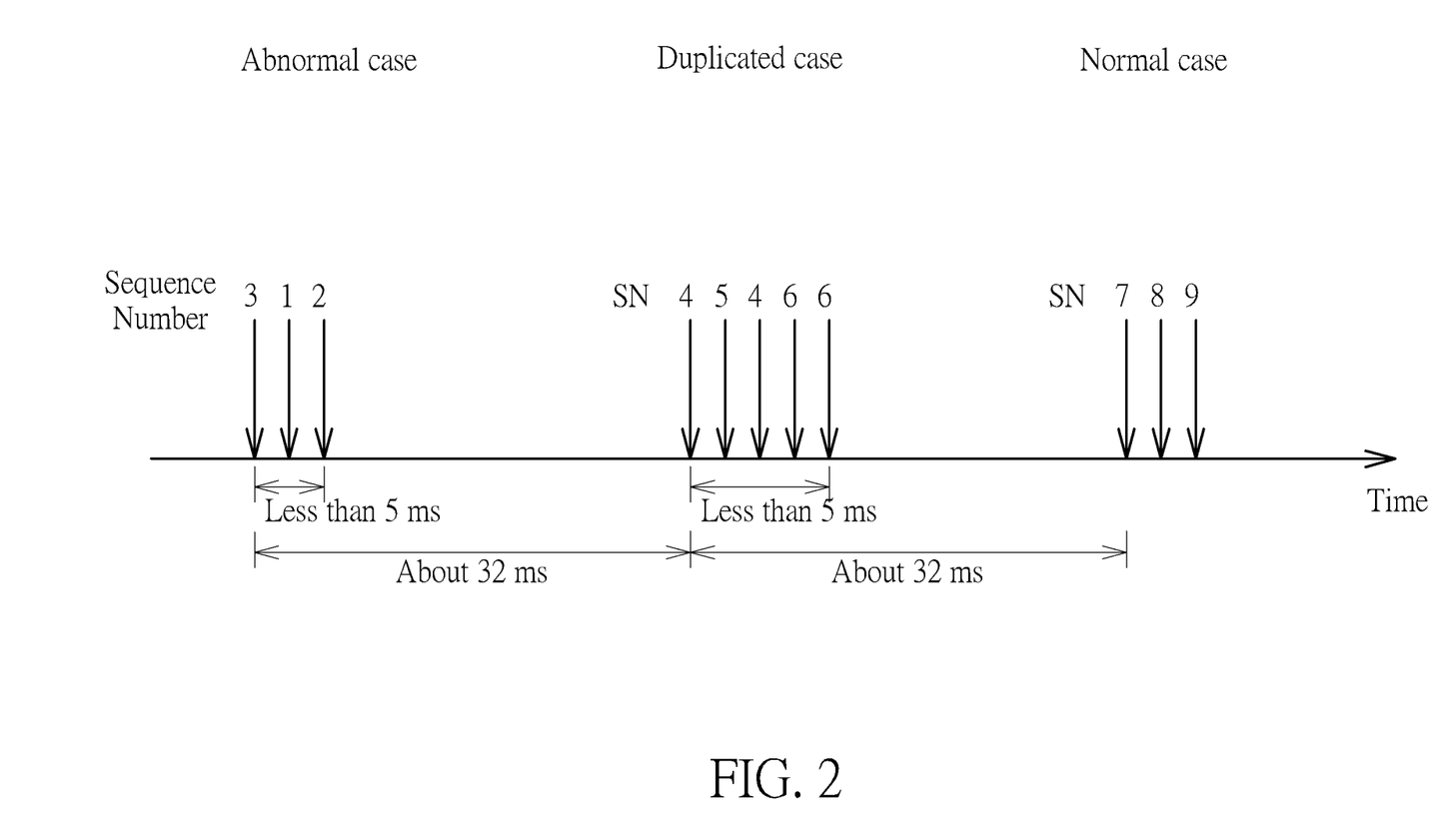
FIG. 2 shows an abnormal case, a duplicated case and a normal case of the received packets.

Besides the abnormal case shown in FIG. 2, the packets are out of order in consecutive audio frames, that is one packet of the audio frame may be transmitted with packets of the other audio frame. For example, referring to FIG. 3, it is assumed that the TV 110 transmits three audio frames to the sound bar 120, wherein a first audio frame F1 is divided into three packets (F1, P0)-(F1, P2) having sequence numbers '1'-'3', respectively, a second audio frame F2 is divided into three packets (F2, P0)-(F2, P2) having sequence numbers '4'-'6', respectively, and a third audio frame F3 is divided into three packets (F3, P0)-(F3, P2) having sequence numbers '7'-'9', respectively. In the abnormal case shown in FIG. 3, the initial three packets received by the sound bar 120 within 5 ms are (F1, P0), (F1, P2) and (F2, P0), then the three packets received by the sound bar 120 within 5 ms are (F2, P1), (F2, P2) and (F1, P1), and the last three packets received by the sound bar 120 within 5 ms are (F3, P0), (F3, P1) and (F3, P2).

Figure 3:
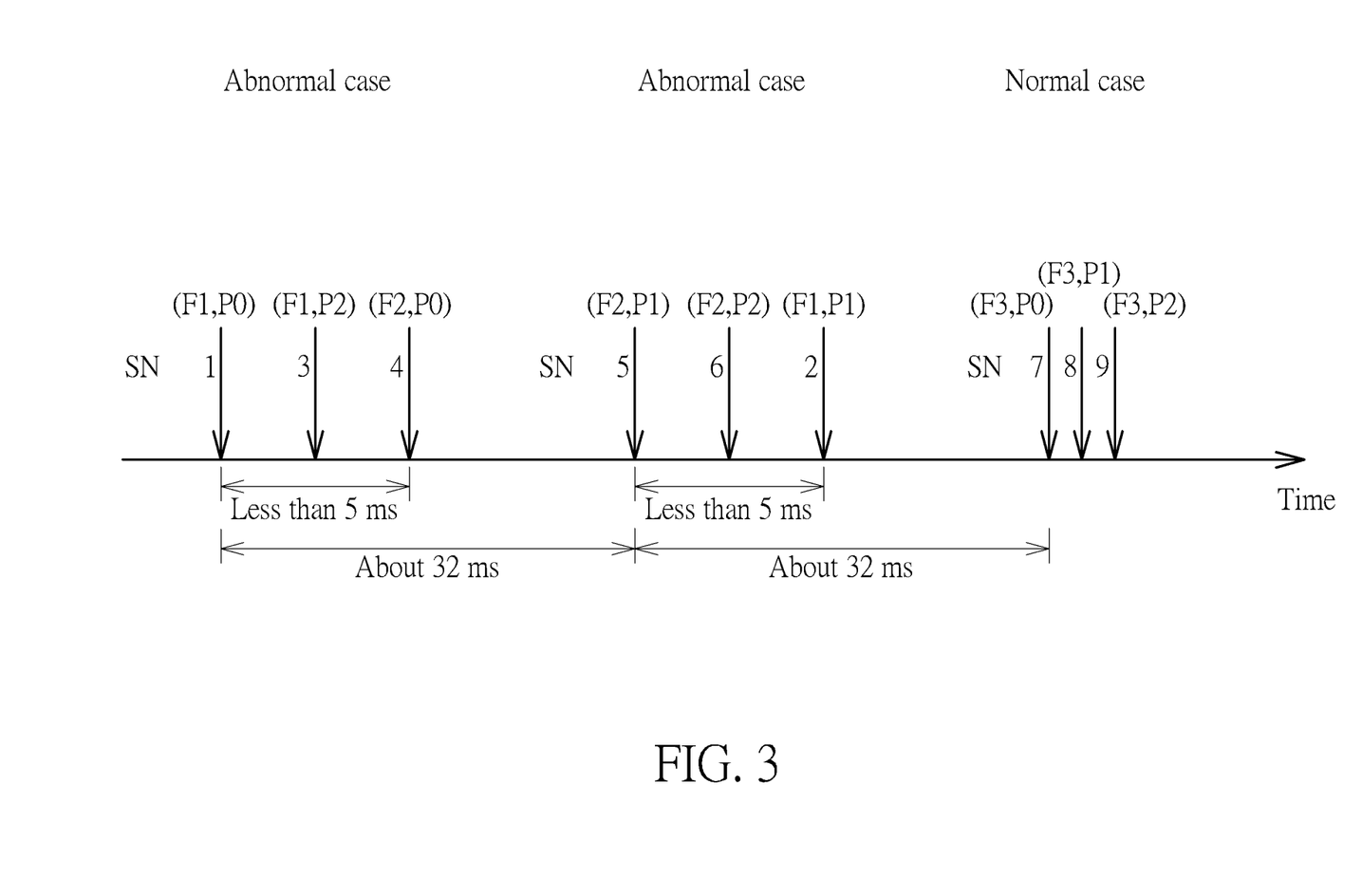
FIG. 3 shows an abnormal case representing that the packets are out of order in consecutive audio frames.
Figure 4:
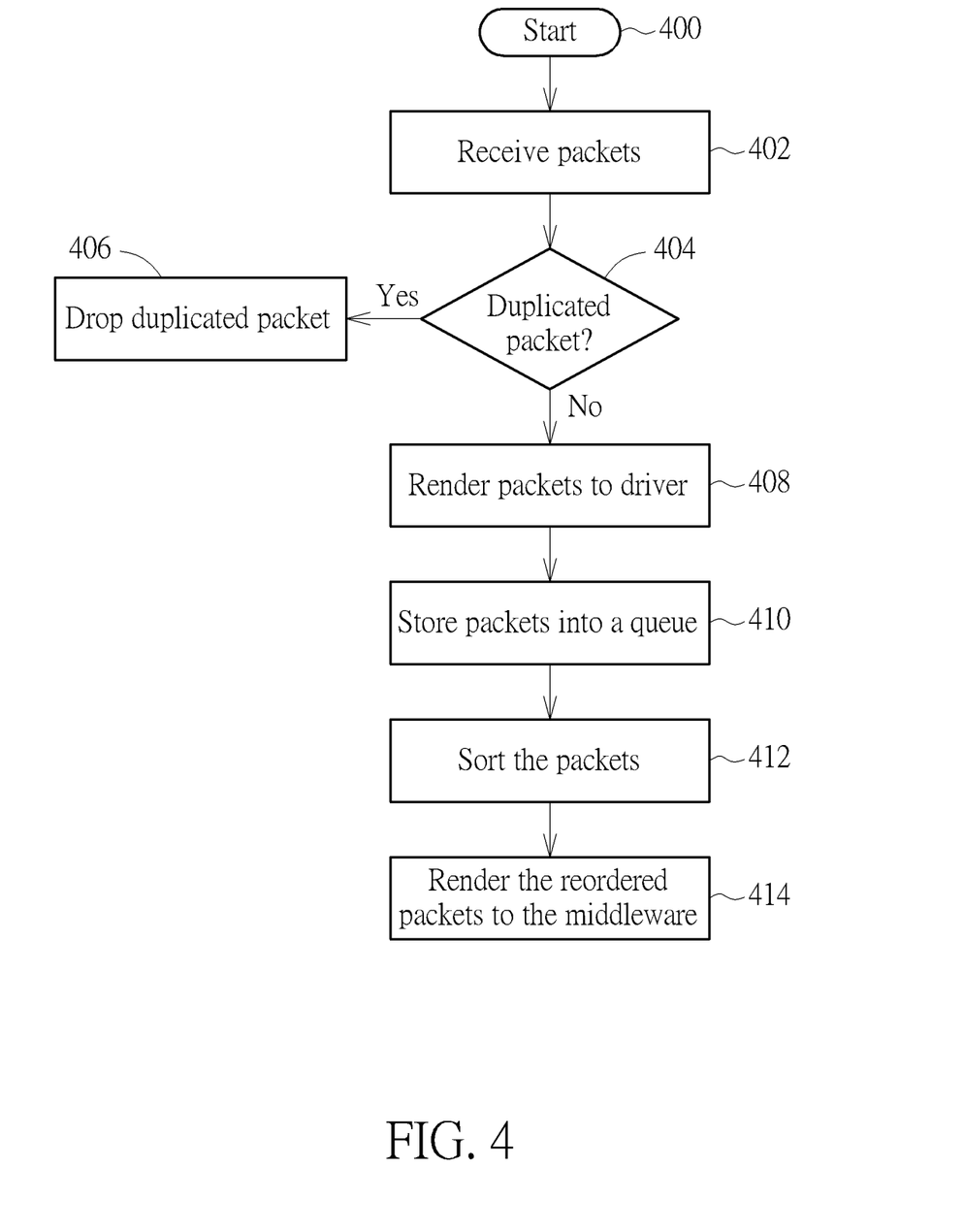
FIG. 4 is a signal processing method according to one embodiment of the present invention.

In order to solve the abnormal cases shown in FIG. 2 and FIG. 3, the sound bar 120 is designed to sort the received packets, so that the sound bar 120 can regenerate the audio frames successfully. Specifically, the sound bar 120 comprises a wireless communication interface 122, a processing circuit 124 and a memory 126 storing a program code, wherein the processing circuit 124 may comprise one or more processor, and the memory 126 may comprise one or more types of memory device. The processing circuit 124 may read the program code from the memory 126 and executes the program code to perform the signal processing method as shown in FIG. 4. As shown in FIG. 4, in Step 400, the flow starts, and the TV 110 establishes a link with the sound bar 120. In Step 402, the processing circuit 124 receives the packets from the TV 110 via the wireless communication interface 122. In Step 404, the processing circuit 124 determines if the current packet is a duplicated packet, if yes, the flow enters Step 406 to drop the current packet; and if not, the flow enters Step 408.

Figure 5:
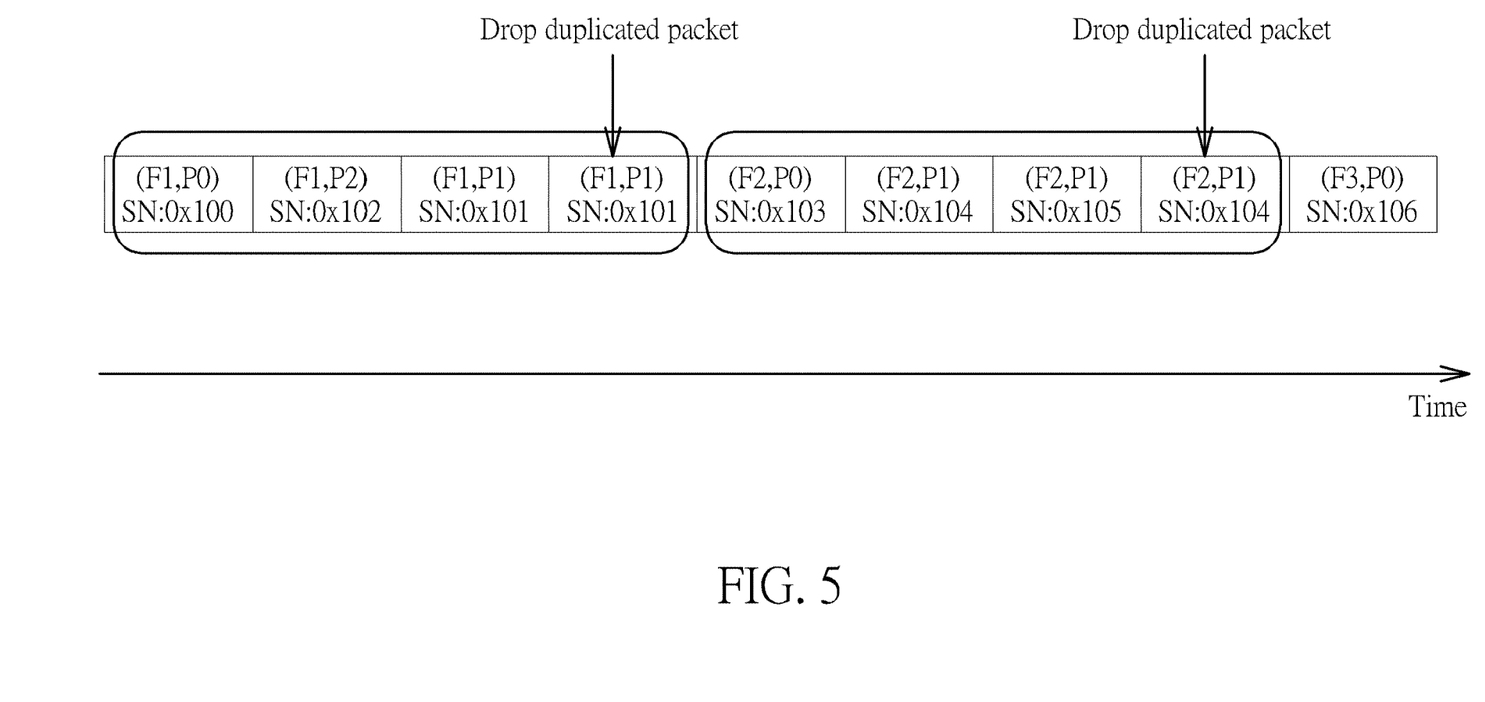
FIG. 5 shows receiving packets having duplicated packet according to one embodiment of the present invention.

Regarding the determination of the duplicated packet, the processing circuit 124 may compare the current packet with the previous packets to determine if the current packet is the duplicated packet. In detail, referring to FIG. 5, if the processing circuit 124 has received the packets (F1, P0), (F1, P2) and (F1, P1) having the sequence numbers '0x100', '0x102' and '0x101', respectively, and the processing circuit 124 receives the packet (F1, P1) having sequence number '0x101' currently, the processing circuit 124 can compare a payload of the current packet (F1, P1) with payload of every one of the received packets (F1, P0), (F1, P2) and (F1, P1). In this embodiment, because the payload of the current packet (F1, P1) is the same as the payload of the previously received packet (F1, P1), the current packet (F1, P1) can be determined as the duplicated packet. Similarly, if the processing circuit 124 has received the packets (F2, P0), (F2, P1) and (F2, P2) having the sequence numbers '0x103', '0x104' and '0x105', respectively, and the processing circuit 124 receives the packet (F2, P1) having sequence number '0x104' currently, the processing circuit 124 can compare a payload of the current packet (F2, P1) with payload of every one of the received packets (F2, P0), (F2, P1) and (F2, P2). In this embodiment, because the payload of the current packet (F2, P1) is the same as the payload of the previously received packet (F2, P1), the current packet (F2, P1) can be determined as the duplicated packet.

In this embodiment, the Steps 404 and 406 can be executed by a firmware of a Wi-Fi chip, that is the Steps 404 and 406 can be executed by using a microprocessor. Therefore, in Step 408, the packets are rendered to a driver (Wi-Fi driver) executed by a central processing unit (CPU) of the processing circuit 124.

In Step 410, the processing circuit 124 stores the received packets into a buffer to form a queue, wherein the queue depth is more than three packets. For example, the queue may be allowed to store five packets.

In Step 412, the processing circuit 124 sorts the received packets to generate the reordered packets. Taking FIG. 6 as an example, it is assumed that the TV 110 transmits three audio frames to the sound bar 120, wherein a first audio frame F1 is divided into three packets (F1, P0)-(F1, P2) having sequence numbers '0x100'-'0x102', respectively, a second audio frame F2 is divided into three packets (F2, P0)-(F2, P2) having sequence numbers '0x103'-'0x105', respectively, and a third audio frame F3 is divided into three packets (F3, P0)-(F3, P2) having sequence numbers '0x106'-'0x108', respectively. In the embodiment shown in FIG. 6, the packets (F1, P0), (F1, P2) and (F1, P1) are sequentially stored in the queue, and the processing circuit 124 sorts the packets (F1, P0), (F1, P2) and (F1, P1) by using any appropriate sort algorithm such as bubble sort, to obtain the reordered packets (F1, P0), (F1, P1) and (F1, P2). Then, the reordered packets (F1, P0), (F1, P1) and (F1, P2) are rendered to a middleware, for regenerate the first audio frame. Then, the packets (F2, P0), (F2, P1) and (F2, P2) are sequentially stored in the queue, and because the received packets are in the correct order, the reordered packets are the same as the received packets, then the reordered packets ((F2, P0), (F2, P1) and (F2, P2) are rendered to the middleware to regenerate the second frame. Finally, the packets (F3, P2), (F3, P1) and (F3, P0) are sequentially stored in the queue, and the processing circuit 124 sorts the packets (F3, P2), (F3, P1) and (F3, P0) to obtain the reordered packets (F3, P0), (F3, P1) and (F3, P2). Then, the reordered packets (F3, P0), (F3, P1) and (F3, P2) are rendered to the middleware for generating the third audio frame.

Figure 6:
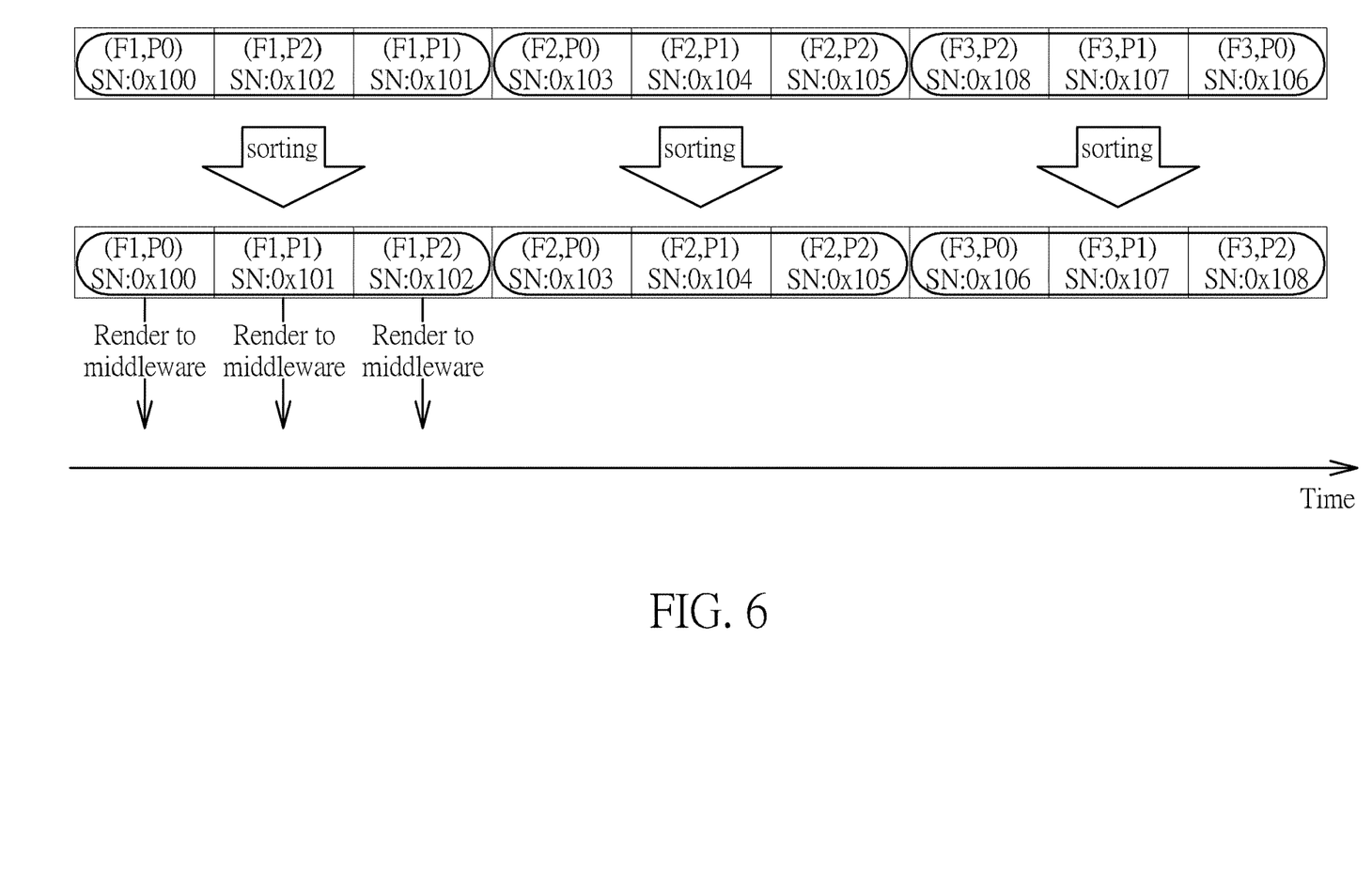
FIG. 6 shows sorting the received packets according to one embodiment of the present invention.
Figure 7:
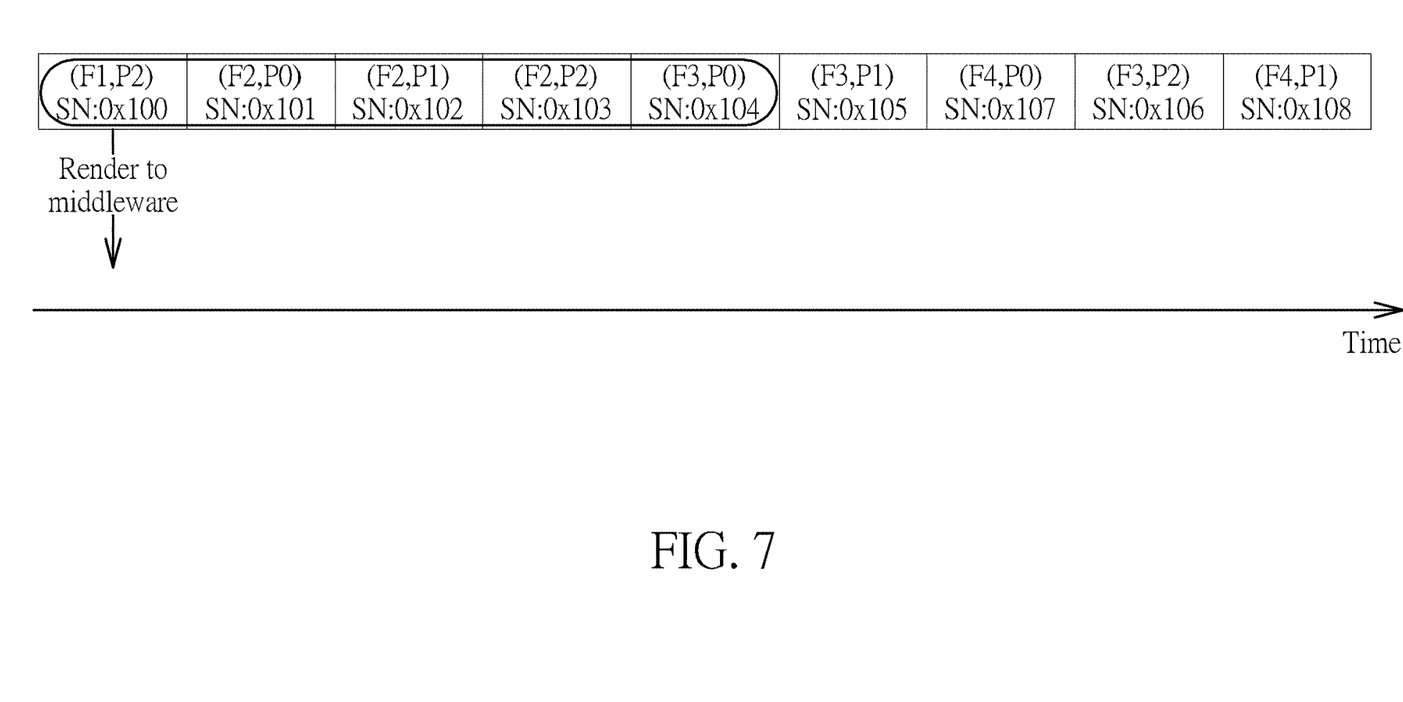
FIG. 7 shows a first sorting case according to one embodiment of the present invention.

The embodiment shown in FIG. 6 is to solve the abnormal case shown in FIG. 2. Regarding the abnormal case shown in FIG. 3, there are two sorting cases provided in this embodiment. FIG. 7 shows a first sorting case according to one embodiment of the present invention. As shown in FIG. 7, it is assumed that the packets (F1, P2), (F2, P0), (F2, P1), (F2, P2) and (F3, P0) are sequentially stored in the queue, and the queue does not contain all packets corresponding to the first audio frame (there is only one packet (F1, P2) of the first audio frame in the queue). At this time, because the queue is full of packets, the packet (F1, P2) is directly rendered to the middleware, without waiting for the other packets (F1, P0) and (F1, P1) of the first audio frame. After the packet (F1, P2) is rendered to the middleware, the packets (F2, P0), (F2, P1) and (F2, P2) corresponding to the second audio frame can be immediately rendered to the middleware, and the following packets are added into the queue sequentially. In the embodiment shown in FIG. 7, if the oldest packet within the queue has not formed a complete audio frame with other packets while the queue is full, the oldest packet within the queue is directly rendered to the middleware.

Figure 8:
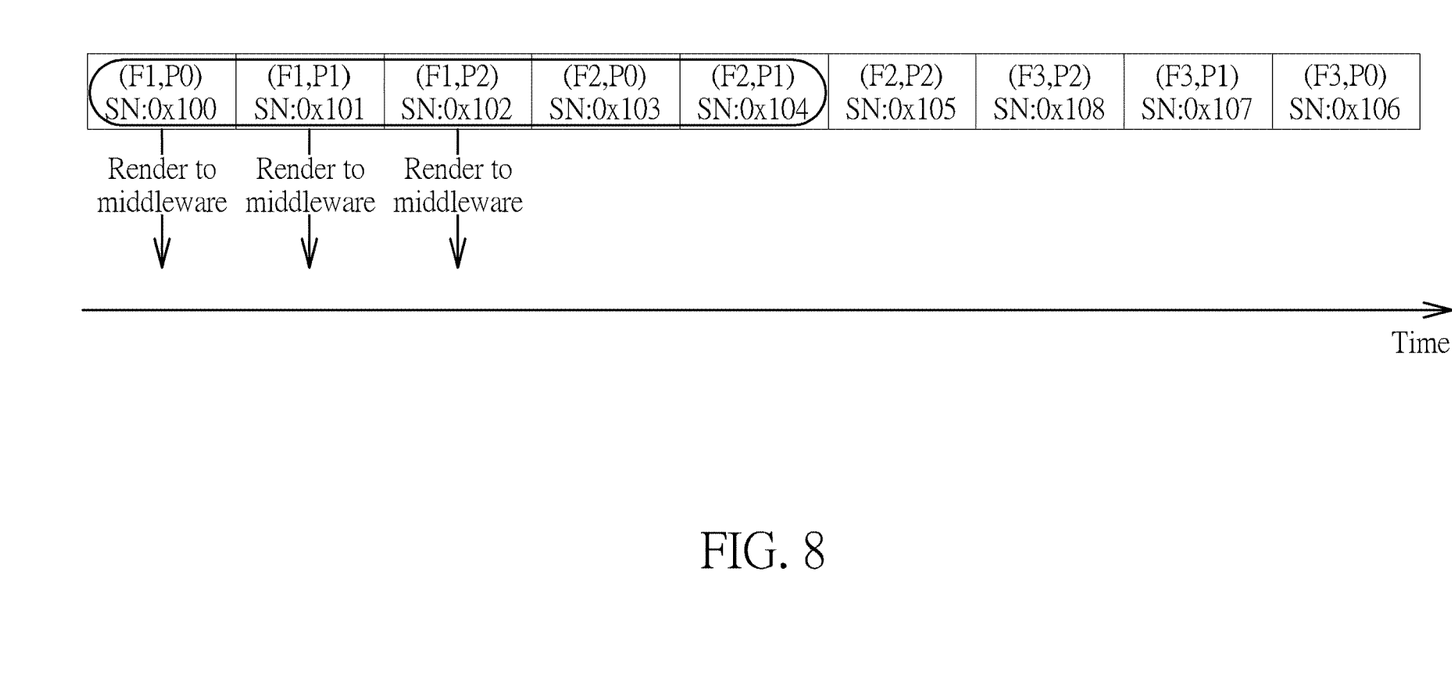
FIG. 8 shows a second sorting case according to one embodiment of the present invention.

FIG. 8 shows a second sorting case according to one embodiment of the present invention. As shown in FIG. 8, it is assumed that the packets within the queue are sorted, and the reordered packets are (F1, P0), (F1, P1), (F1, P2), (F2, P0) and (F2, P1). At this time, because the queue has contained all packets (F1, P0), (F1, P1) and (F1, P2) corresponding to the first audio frame, the packets (F1, P0), (F1, P1) and (F1, P2) are rendered to the middleware at once, for the following packets to be immediately added into the queue.

In light of above, by using the above sorting algorithm to sort the received packets to generate the reordered packets, the processing circuit 124 does not need to drop many packets that do not have consecutive sequence numbers, and the sound bar 120 can play high-quality sound without interruption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing method of a speaker, comprising:
    receiving a plurality of packets, wherein the plurality of packets correspond to at least two audio frames, each audio frame has at least two of the packets, and each packet comprises a sequence number indicating an order of the packet in the plurality of packets;
    sorting the plurality of packets to generate reordered packets; and
    rendering the reordered packets to a middleware to regenerate the at least two audio frames;
    wherein the step of sorting the plurality of packets to generate the reordered packets further comprises:
        using a buffer to sequentially store the plurality of packets to form a queue, wherein a queue depth is more than three packets;
        sorting the packets within the buffer; and
        if the reordered packets in the buffer are not allowed to form a single audio frame, rendering an oldest packet within the buffer to the middleware.

2. The signal processing method of claim 1, further comprising:
    before a step of sorting the plurality of packets to generate the reordered packets, determining if the plurality of packets comprise a duplicated packet; and
    if the plurality of packets comprise a duplicated packet, dropping the duplicated packet from the plurality of packets, and the step of sorting the plurality of packets comprises sorting the plurality of packets without the duplicated packet.

3. The signal processing method of claim 2, wherein the step of dropping the duplicated packet from the plurality of packets is performed by a firmware executed by a microprocessor, and the step of sorting the plurality of packets to generate the reordered packets is performed by a Wi-Fi driver executed by a central processing unit.

4. The signal processing method of claim 1, wherein the step of sorting the plurality of packets to generate the reordered packets further comprises:
    if the reordered packets in the buffer are allowed to form the single audio frame, rendering the reordered packets to the middleware at once.

5. The signal processing method of claim 1, wherein each audio frame has three of the packets, and the queue depth is five packets.

6. A circuitry within a speaker, configured to perform the steps of:
    receiving a plurality of packets, wherein the plurality of packets correspond to at least two audio frames, each audio frame has at least two of the packets, and each packet comprises a sequence number indicating an order of the packet in the plurality of packets;
    sorting the plurality of packets to generate reordered packets; and
    rendering the reordered packets to a middleware to regenerate the at least two audio frames;
    wherein the step of sorting the plurality of packets to generate the reordered packets further comprises:
        using a buffer to sequentially store the plurality of packets to form a queue, wherein a queue depth is more than three packets;
        sorting the packets within the buffer; and
        if the reordered packets in the buffer are not allowed to form a single audio frame, rendering an oldest packet within the buffer to the middleware.

7. The circuitry of claim 6, further comprising:
    before a step of sorting the plurality of packets to generate the reordered packets, determining if the plurality of packets comprise a duplicated packet; and
    if the plurality of packets comprise a duplicated packet, dropping the duplicated packet from the plurality of packets, and the step of sorting the plurality of packets comprises sorting the plurality of packets without the duplicated packet.

8. The circuitry of claim 7, wherein the step of dropping the duplicated packet from the plurality of packets is performed by a firmware executed by a microprocessor, and the step of sorting the plurality of packets to generate the reordered packets is performed by a Wi-Fi driver executed by a central processing unit.

9. The circuitry of claim 6, wherein the step of sorting the plurality of packets to generate the reordered packets further comprises:
    if the reordered packets in the buffer are allowed to form the single audio frame, rendering the reordered packets to the middleware at once.

10. The circuitry of claim 6, wherein each audio frame has three of the packets, and the queue depth is five packets.

* * * * *